United States Patent [19]

Weelink

[11] Patent Number: 5,467,737
[45] Date of Patent: Nov. 21, 1995

[54] STABLE WITH FEEDING SYSTEM

[76] Inventor: J. M. W. Weelink, Tynaarlosestraat 58, 9481 AD Vries, Netherlands

[21] Appl. No.: 216,486

[22] Filed: Mar. 22, 1994

[30] Foreign Application Priority Data

Mar. 22, 1993 [NL] Netherlands ............................ 9300501

[51] Int. Cl.$^6$ .................................................... A01K 1/10
[52] U.S. Cl. ............................ 119/60; 119/57.92; 119/20
[58] Field of Search ............................ 119/51.01, 51.11, 119/57.92, 60, 20

[56] References Cited

FOREIGN PATENT DOCUMENTS

| 0043098 | 1/1982 | European Pat. Off. . |
| 2415428 | 9/1979 | France ...................................... 119/60 |
| 8016891 | 6/1980 | Germany . |
| 8021740 | 8/1980 | Germany . |
| 7805548 | 11/1979 | Netherlands ............................ 119/60 |
| 178989 | 5/1922 | United Kingdom ..................... 119/60 |

Primary Examiner—Robert P. Swiatek
Attorney, Agent, or Firm—Varnum, Riddering, Schmidt & Howlett

[57] ABSTRACT

A stable with a dwelling area (2) for animals, a feeding area (1) for storing and presenting feed (5) and a partition (3) between the dwelling area (2) and the feeding area (1), provided with openings for allowing the heads of animals in the dwelling area (2) access to the feeding area (1), is equipped with a feed slide (6) moveable from a starting position through the feeding area (1) towards the partition (3), for pushing feed (5) stored in the feeding area (1) over the floor (4) of the feeding area (1) towards the partition (3) and with means for driving the feed slide (6). By means of the feed slide, feed (5) can be pushed towards the partition (3) according as the feed (5) is being eaten, so that at all times a substantially constant small amount of feed is accessible to the animals.

22 Claims, 6 Drawing Sheets

STABLE WITH FEEDING SYSTEM

BACKGROUND OF THE INVENTION

The invention relates to a stable, in particular a cubicle stable for keeping cows, comprising a dwelling area for animals, a feeding area with a floor for storing and presenting feed and a partition between the dwelling area and the feeding area with openings allowing heads of animals in the dwelling area access to the feeding area.

In known stables of this type, the feed is placed in desired amounts in the part of the feeding area near the partition. This is a labor-intensive activity, even if special costly machines for displacing the feed are employed.

An animal in the dwelling area can reach the feed placed in the feeding area by sticking its head through an opening in the partition. When a large amount of feed is placed so close to the partition that it is accessible to the animals in the dwelling area, a problem arises in that the animals turn up the feed and slaver onto the feed, so that the quality and the keepability of the feed deteriorate strongly. Presenting smaller amounts of feed in succession at the partition entails the drawback of a further increase of the labor intensiveness.

Under the designation "WEELINK-SYSTEM" a stable device is offered on the market, whereby the aforementioned problems have been obviated by virtue of the movable design of the partition. By placing the feed at a suitable distance from the partition, so that the animals can just reach the feed, and pushing the partition to the feed according as it is being consumed, a situation is realized where at all times a small portion of the feed is accessible to the animals. As a result, at all times the animals eat fresh feed from the side of the feed placed in the feed area (mostly in the form of packs or compressed blocks). As a consequence, it is sufficient to supply feed once every 6–8 days, for which a common tractor, optionally equipped with a silage cutter, can be used. In stables provided with such a device cows take in the food faster and the uptake of dry feed is so much better that approx. 25% of the costs of concentrated food can be saved.

SUMMARY OF THE INVENTION

The object of the invention is to provide a stable which, firstly, provides the advantages of the WEELINK-SYSTEM and, secondly, can be realized in existing stables in simpler manner and at lower costs, regardless of whether these stables have a dwelling area located lower than the feeding area and regardless of whether they comprise a grid floor in the dwelling area.

This object is achieved in accordance with the present invention by providing a stable of the above-described type with at least one feed slide moveable from a starting position through the feeding area to the partition for pushing feed stored in the feeding area over the floor of the feeding area to the partition and means for driving the feed slide.

By means of the feed slide moveable from a starting position through the feeding area to the partition, feed stored in the feeding area can be pushed over the floor of the feeding area towards the partition, the feed slide being driven by the means for driving the feed slide. Thus, the feed can be moved up towards the partition when it has been partly eaten, so that the distance from the partition to the feed can be kept substantially constant and at all times only a small portion of the feed is accessible to the animals behind the partition.

In the stable according to the invention, the partition is located at a fixed point, so that in the practice of the invention the existing fixed partition in an existing stable can be maintained. Moreover, because the partition between the feeding area and the dwelling area is located at a fixed point, some difference between the levels of the dwelling area and the feeding area, the latter being located somewhat higher in most cases, is not objectionable. Moreover, the floor of the dwelling area need not be provided with means for removing manure moved up upon displacement of the partition.

A further advantage of the stable according to the invention is that the partition which is loaded by the animals to highly varying degrees and in different directions, is of fixed design and may accordingly be anchored in the floor. In use the movably constructed feed slide is only subject to a substantially constant load substantially in one specific direction, so that it can be of simpler moveable design than the partition.

Because the feed is displaced over the floor of the feeding area, this floor need only be sufficiently smooth and no further adaptations of the floor of the feeding area are necessary.

The invention may further be embodied in an assembly comprising a feed slide moveable over a floor and means for moving the feed slide over a floor, with which assembly an existing conventional stable of the type described above can be laid out as a stable according to the invention.

Hereinafter the invention is further explained on the basis of some exemplary embodiments, with reference to the drawings.

DETAILED DESCRIPTION OF EMBODIMENTS OF THE INVENTION

In the drawings corresponding parts of different embodiments have been designated with the same reference numerals.

The invention will first be further explained with reference to FIG. 1.

Figure 1:
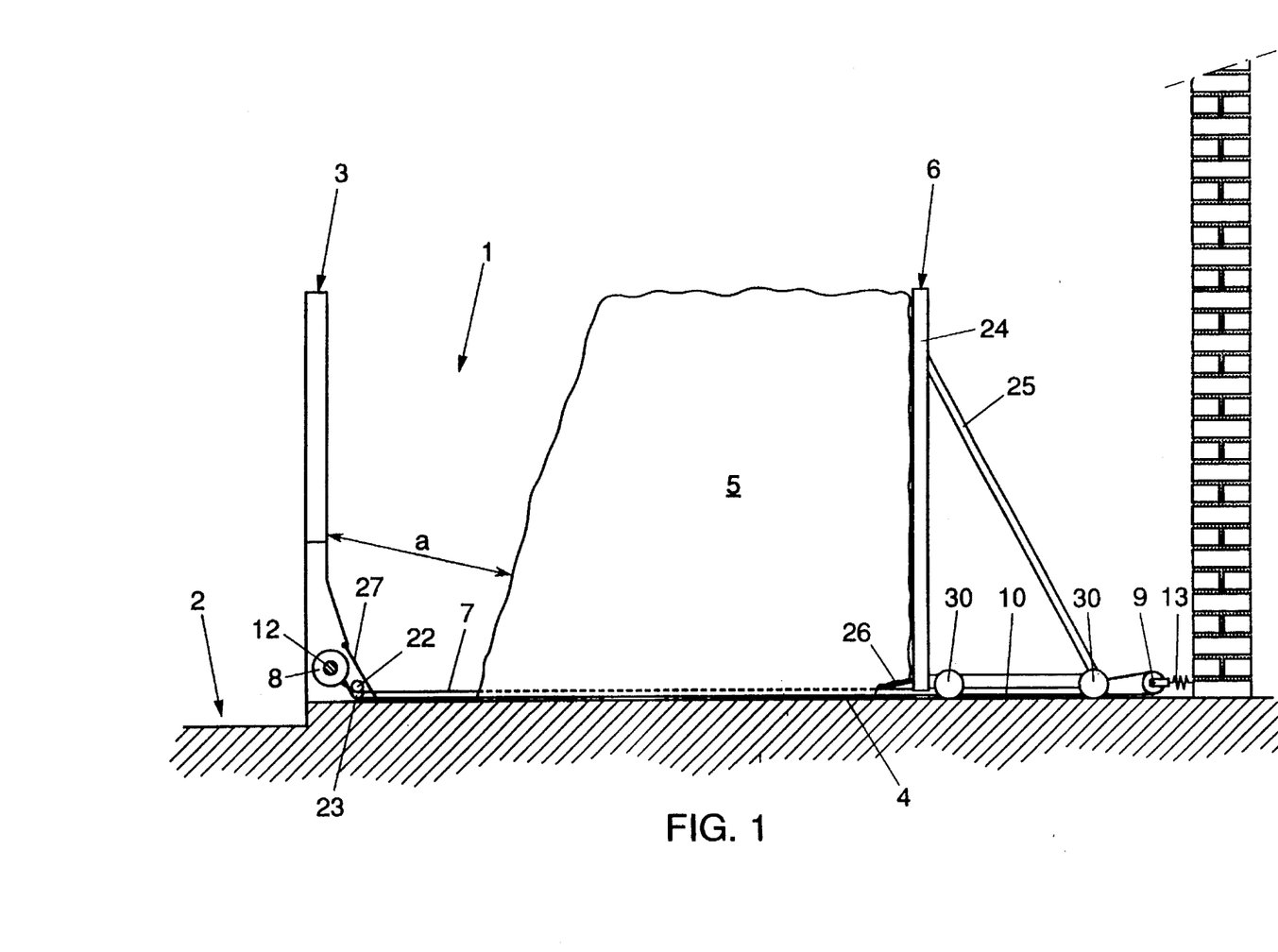
FIG. 1 is a side elevation of a part of a stable according to an exemplary embodiment of the invention which is preferred most at this moment.

FIG. 1 depicts a stable with a feeding area 1 and a dwelling area 2 separated by a partition 3. The partition 3 is generally designed as a fence and is typically designated by the name of feeding fence, but may be designed in any other suitable way, for instance as a wall or as a rack suspended at a distance from the floor. The feeding area comprises a floor 4, on which compressed blocks of feed 5 have been placed. As is known per se, the partition 3 is provided with openings (not shown), so that animals can reach feed 5 in the feeding area from the dwelling area 2 by way of their heads. Stables with a feeding area 1 and a dwelling area 2 separated by a partition 3 are known from practice and in use in very large numbers.

Arranged in the feeding area 1 is a feed slide 6 moveable towards the partition 3 for pushing the feed 5 stored in the feeding area 1 over the floor 4 of the feeding area 1 towards the partition 3. The stable further comprises means for driving the displacement of the feed slide 6.

The starting position of the feed slide 6 is selected such that feed 5—generally in the form of packs or blocks of corn feed and silage—placed against the feed slide is located at a distance "a" from the partition 3, such that the animals behind the partition 3 can just reach the feed 5. When the animals have eaten the accessible feed in whole or in part, the slide 6 is displaced towards the partition 3 until the distance "a" between the feed 5 and the partition 3 has been re-established again. At a given stock occupation of the dwelling space, the displacement of the feed slide 6 required per unit time is substantially constant, so that the displacement of the feed slide 6 is automatically controllable in simple manner.

The partition 3 is always located in the same position, so that some difference in the levels of the dwelling area 2 and the feeding area 1, for instance as depicted in FIG. 1, does not constitute a drawback. Any difference in the height of the feeding area 1 and the dwelling area, which is often present in conventional stables, can thus be maintained, so that the floor can be left unmodified.

Both the feed 5 and the feed slide 6 can be moved over the floor 4 of the feeding area 1. For that purpose, the floor 4 need only be sufficiently flat, which is already typically the case in conventional stables. In this respect too, therefore, generally no adaptation of the floor of the stable is necessary.

The means for driving the feed slide 6 comprise a plurality of flexible hauling elements 7 (see also FIGS. 2 and 3) between the feed slide 6 and the partition 3 for hauling the feed slide 6 towards the partition 3. Obviously, instead of a plurality of hauling elements 7, a single hauling element can be used as well. The flexible hauling elements 7 can simply be wound up or diverted near the partition 3 and form simple elements by which large forces can be exerted on the feed slide 6. Thus, the partition 3 can also be used as anchorage for the drive for the displacement of the feed slide 6.

In the exemplary embodiment shown, this anchoring possibility has been made use of in that the means for driving the feed slide 6 comprise reels 8 for winding up the hauling elements 7. These reels can simply be rotatably mounted at any desired point, for instance on the feed slide, on the wall opposite the partition or spaced above or under the partition. Further, the reels allow a large force to be exerted on the hauling elements and they also form a compact storage for parts of the hauling elements which have been moved to the reels.

Preferably, the reels 8 are rotatably attached to the partition 3. In that case, parts of the hauling elements 7 which have reached the partition 3 need not be diverted and are stored compactly.

When the feed 5 has been used up, the feed slide 6 can in principle be returned to its starting position by one or more persons tending the stable. However, with a view to saving labor, it is more favorable if the feed slide 6 can also be returned to its starting position by a mechanical drive.

For that purpose, in the stable according to the depicted exemplary embodiment the means for driving the feed slide 6 are equipped with divert wheels 9 mounted on the side of the feed slide 6 remote from the partition 3, second hauling elements 10 running over the divert wheels 9 between the feed slide 6 and second reels 11, coupled with the above-mentioned reels 8, for winding up the second hauling elements 10. As the first hauling elements 7 are being wound on the first reels 8 for hauling the feed slide 6 towards the partition 3, the second hauling elements 10 automatically unwind off the second reels 11. During the retraction of the feed slide 6 the means for driving the displacement of the feed slide 6 act in reverse direction.

Figure 3:
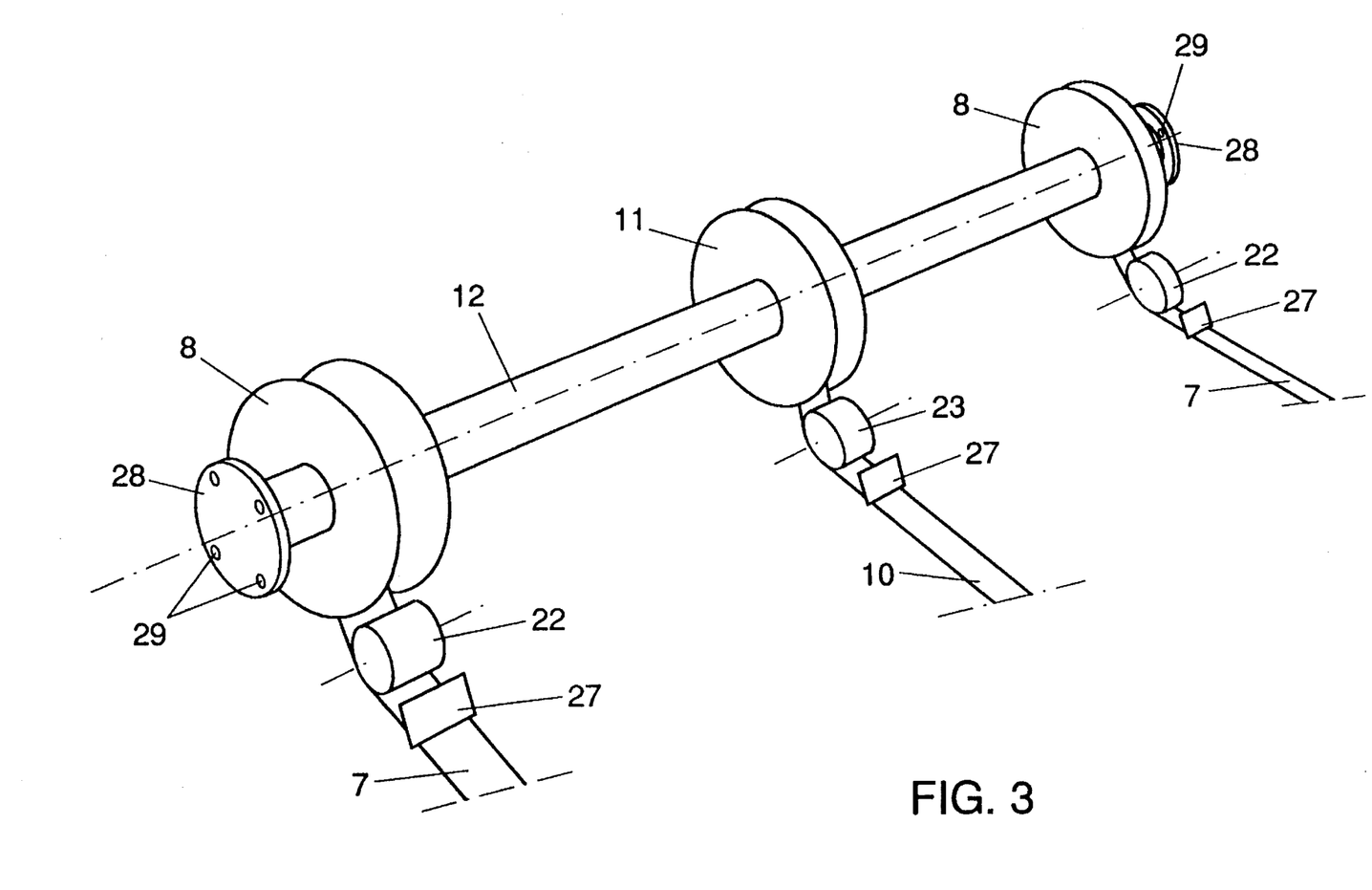
FIG. 3 is a perspective view of a drive module.

A simple coupling between the first reels 8 and the second reels 11 has been obtained in that the second reels 11, along with the first-mentioned reels 8, have been mounted on a common shaft 12, the first and the second reels 8, 11 being restrained from rotation relative to each other. This offers the further advantage that a construction of the means for operating the hauling elements 7 is obtained which does not project far transversely to the partition 3. The opposite action of the first reels 8 and the second reels 11 has been obtained in that the winding direction of the second hauling elements 11 is opposite to the winding direction of the first hauling elements 7 about the first reels 8. This is evident most clearly from FIG. 3, depicting the reels 8, 11 of a single drive module. It is noted that the shaft 12 with the reels 8, 11 may obviously be suspended at a different point, for instance from the feed slide 6, from a wall located opposite the partition 3 or spaced above or under the partition 3. If the shaft is mounted on the feed slide, it may for instance be driven by means of a flexible shaft, from a source of power arranged in a fixed position. It is also possible to mount the source of power on the feed slide as well, so that an automotive feed slide is obtained.

The first and the second reels 8, 11 will practically always have different lengths of the hauling elements 7, 10 wound onto them, so that they have different outer circumferences and the lengths of the hauling elements which are being wound up or unwound at a given angular displacement will be different for the first and the second reels 8, 11. In order to avoid the situation where, as a result of this, the hauling elements are too long or too short in certain positions of the feed slide 6, the means for driving the feed slide 6 comprise tensioners 13 for keeping tensioned parts of the second hauling elements 10 between the second reels 11 and the feed slide 6. That the second hauling elements are maintained under tension provides the advantage that a relatively low force to be exerted by the tensioners 13 will suffice because the second hauling elements 10 only serve for retracting the feed slide 6 and, accordingly, the maximum force to be exerted by the second hauling elements 10 is considerably smaller than the maximum force to be exerted by the first hauling elements 7.

It is noted that the effect that at a given angular displacement the length of the first hauling elements 7 that is being wound up or unwound is not equal to the length of the second hauling elements 10 which is being unwound or wound up, can be limited and even obviated by winding the hauling elements onto the reels following a helical line, so that windings of a hauling element are placed on the associated reel exclusively or mainly in side-by-side relationship and not, or at least to a lesser extent, over each other. For the drive of the reels 8, 11 they are coupled with a ratchet wheel 14 (FIG. 4), operable by a pawl 15 which is coupled with a working cylinder 16. According to the exemplary embodiment shown, the coupling between the pawl 15 and the working cylinder 16 is designed as a lever 17. The lever 17 can be pivoted about the axis of the ratchet wheel 14 and is coupled with the working cylinder 16 at a distance from that access. Between the axis and the working cylinder the pawl 15 is pivotally connected with the lever 17. When the working cylinder 16 is moved back and forth, the pawl 15 successively engages a next tooth of the ratchet wheel 14 and the pawl 15 pushes that tooth away. In order to avoid the wheel 14 springing back upon the reversing movement of the pawl 15, a second pawl 18, pivoted to a fixed point, engages the wheel 14.

Figure 4:
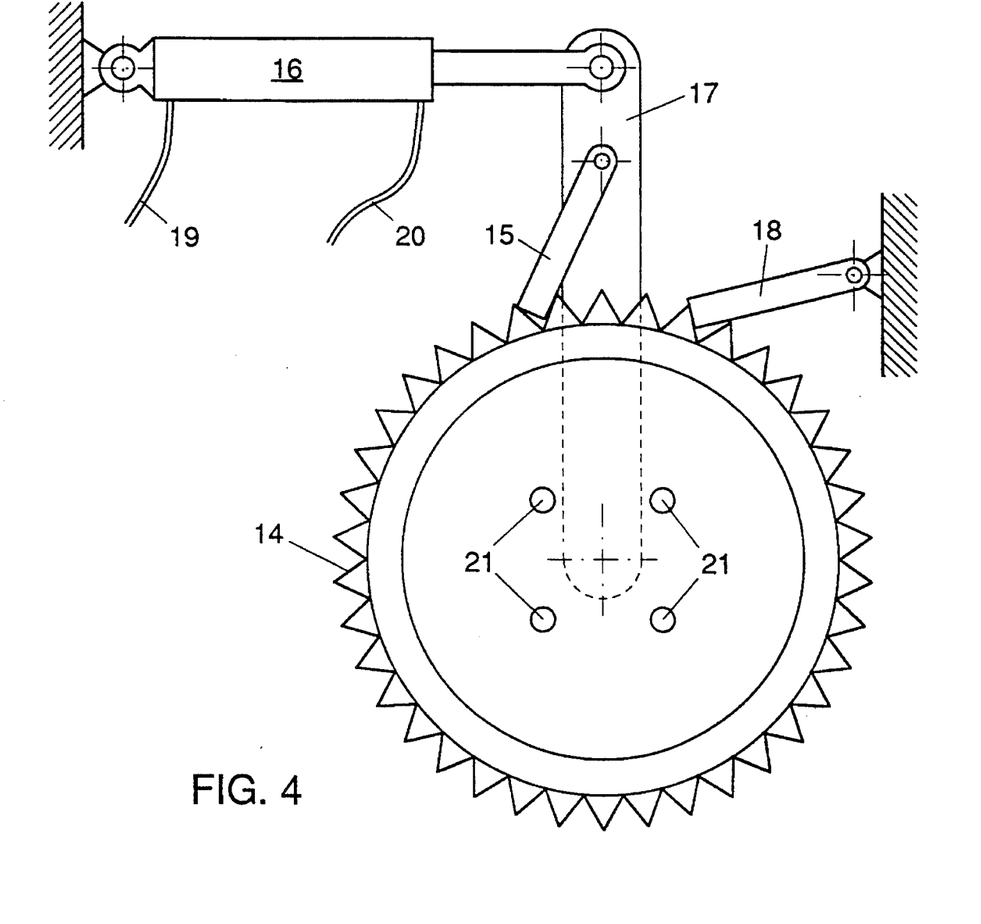
FIG. 4 is a side elevation of an assembly for driving the drive modules.

By pivoting the pawl 15 to the opposite side of the lever 17 and setting the second pawl 18 out of operation, the direction of rotation in which the ratchet wheel 14 is driven can be reversed. Thus both the displacement of the feed slide 6 towards the partition 3 and the retraction of the feed slide 6 to its starting position can be driven by the ratchet wheel drive.

The working cylinder 16 is designed as a double-acting pneumatic cylinder having two pressure lines 19, 20 connected thereto.

For safety reasons, the pawl drive is preferably accommodated in a housing, thereby avoiding parts of the body of people or animals getting caught by it.

The use of a ratchet wheel drive provides the advantage that the large forces required for displacing the feed slide 6 in the case of controlled small displacements can be realized in simple manner. One stroke of the working cylinder corresponds with a particular displacement of the feed slide. In the case of variations in the effective diameter of the reels 8, 11, some variation in the displacement of the feed slide 6 may occur at a given angular displacement, but these variations are not of importance in practice and, if desired, can simply be obviated by setting the control of the working cylinder in such a manner that the number of strokes per unit time decreases according as the first hauling elements 7 are wound further onto the first reels 8.

The displacement of the feed slide can also be controlled by means of feedback, for instance by means of a beam of light which is interrupted when feed is located within a specified distance from the partition 3. Whenever the beam of light is not interrupted for a prolonged time, the feed slide 6 is moved towards the partition 3.

The ratchet wheel is provided with apertures 21, through which bolts can be inserted for connecting a flange of a shaft on which reels 8, 11 are mounted.

Instead of a ratchet wheel, a different drive can be used as well, such as an electric motor in combination with a suitable reduction. A worm transmission is very suitable as a reduction because it is self-locking and therefore prevents the electric motor from being driven by displacement of the feed slide. In tensioned condition the hauling elements 7, 10 extend closely above the floor 4 of the feeding area 1. This provides the advantage that the feed can be placed in a random position on the hauling elements 7, 10 and the floor 4, so that the places where the hauling elements 7, 10 extend need not be taken into consideration when placing the feed. Further advantages of this position of the hauling elements 7, 10 are that they need not be lowered to allow a tractor to drive into the feeding area 1 to place the feed 5; that the feeding area can readily be walked through even when the hauling elements 7, 10 are in operation; and that the hauling elements do not hamper the accessibility of the feed 5 to the animals. A further advantage of the course of the hauling elements 7, 10 over the floor 4 is that the floor need not be provided with slots for the hauling elements. The provision of such slots is costly. Moreover, dirt and feed would tend to accumulate in the slots, which would make it more difficult to clean the floor. In spite of the fact that the packs of feed 5 have a large weight they can yet be placed on the hauling elements without displacement of the hauling elements relative to the feed or the floor leading to substantial friction or substantial wear of the hauling elements. It is true that the packages of feed have a large weight, but they are readily compressible and the weight is distributed over a large area, so that the pressure exerted on the hauling elements is yet slight.

In order to continuously keep the hauling elements as low as possible along the floor, the means for driving the feed slide 6 are equipped with down-holder wheels 22, 23 over which the hauling elements 7, 10 run.

The feed slide 6 comprises substantially vertical screens 24 and supports 25 projecting from the screens 24 on the side remote from the partition 3. The screens 24 connect to one side of the packages arranged in the feeding area 1, while the supports 25 prevent the feed slide 6 from tilting backwards under the influence of the force exerted by the hauling elements 7 and the reaction force exerted on the feed slide 6 by the feed 5 at a distance thereabove. The supports 25 further provide the advantage that the feed slide 6 also remains upright when no feed 5 is present in the feeding area 1.

The screens may for instance be designed as closed walls or as open grids.

To prevent the feed slide from tilting backwards, hauling elements connected with the feed slide may optionally be spaced from the floor of the feeding area. In that case, they should preferably be arranged at a height such that a tractor can drive under these hauling elements.

Further, the feed slide 6 is provided with plane feet 26, projecting from the screens 24 in the direction of the partition 3. These feet 26 are designed as plates on which bears feed 5 placed against the feed slide 6. The weight of the feed 5 bearing on the plates 26 prevents the feed slide 6 from tilting backwards with the plates 26 moving upwards. Instead of being designed as plates, the feet may for instance be designed as rakes whose teeth in use project under and into the feed.

To limit friction and wear, the feed slide 6 is provided with wheels 30 which render the feed slide 6 mobile over the floor 4.

The hauling elements 7, 10 are designed as hauling bands. This provides the advantage that at a given hauling strength they are relatively plane and the risk of people becoming injured by accidentally stepping onto the hauling elements 7, 10 or stumbling over them is limited. Further, the compression of the packages of feed at the point where they are located on the hauling bands is relatively slight because of the relatively minor height of the bands, so that the pressure exerted on the hauling bands is relatively small. The hauling bands may for instance be made from polyamide or any other current material for bands.

Arranged on the side of the feeding area 1, in front of the partition 3 are means 27 for removing adherent feed from the hauling elements 7, thereby avoiding such feed being wound onto the reels 8, 11. These means for removing adherent feed from the hauling elements are designed as scrapers 27. They also constitute a shield for the down-holder wheels 22, 23, so that animals or people are prevented from getting caught between the down-holder wheels 22, 23 and the hauling elements 7, 10.

The means for removing adherent feed from the hauling elements can also be designed as brushes. By making them of rotary construction, it can be ensured that the hauling elements are always thoroughly cleaned before they are rolled onto the reels.

The feed slide 6 of the stable according to the exemplary embodiment shown is made up of a plurality of feed slide modules pivotally coupled to each other with some clearance in horizontal direction parallel to the feed slide. The means for driving the feed slide 6 are made up of a plurality of drive modules which correspond in number with the number of feed slide modules and are each coupled for driving the displacement of a specific associated feed slide module. As a consequence, the feed slide and the associated drive can be simply manufactured in a length corresponding with the length of the partition. Because the feed slide modules are movable relative to each other to some extent, the hauling force is uniformly distributed over the hauling elements 7 without requiring highly accurate control of the length of the hauling elements 7.

The shaft on which reels of a drive module (see FIG. 3) are mounted comprises flanges 28 with holes 29 through which bolts can be inserted for coupling successive drive modules to each other and for attaching the shaft of the first drive module to the ratchet wheel 14. The feed slide according to the invention may consist of a single or several feed slide modules.

It has been found that when the proposed stable is used, in some cases the feed blocks 5 upon displacement disintegrate further and the feed is mixed more than is desirable, which hampers the accurate metering of the amount of feed accessible to the animal and causes a relatively large amount of feed to be disposed in front of the partition 3, so that the above-mentioned problem of slavering onto the feed still occurs.

Figure 2:
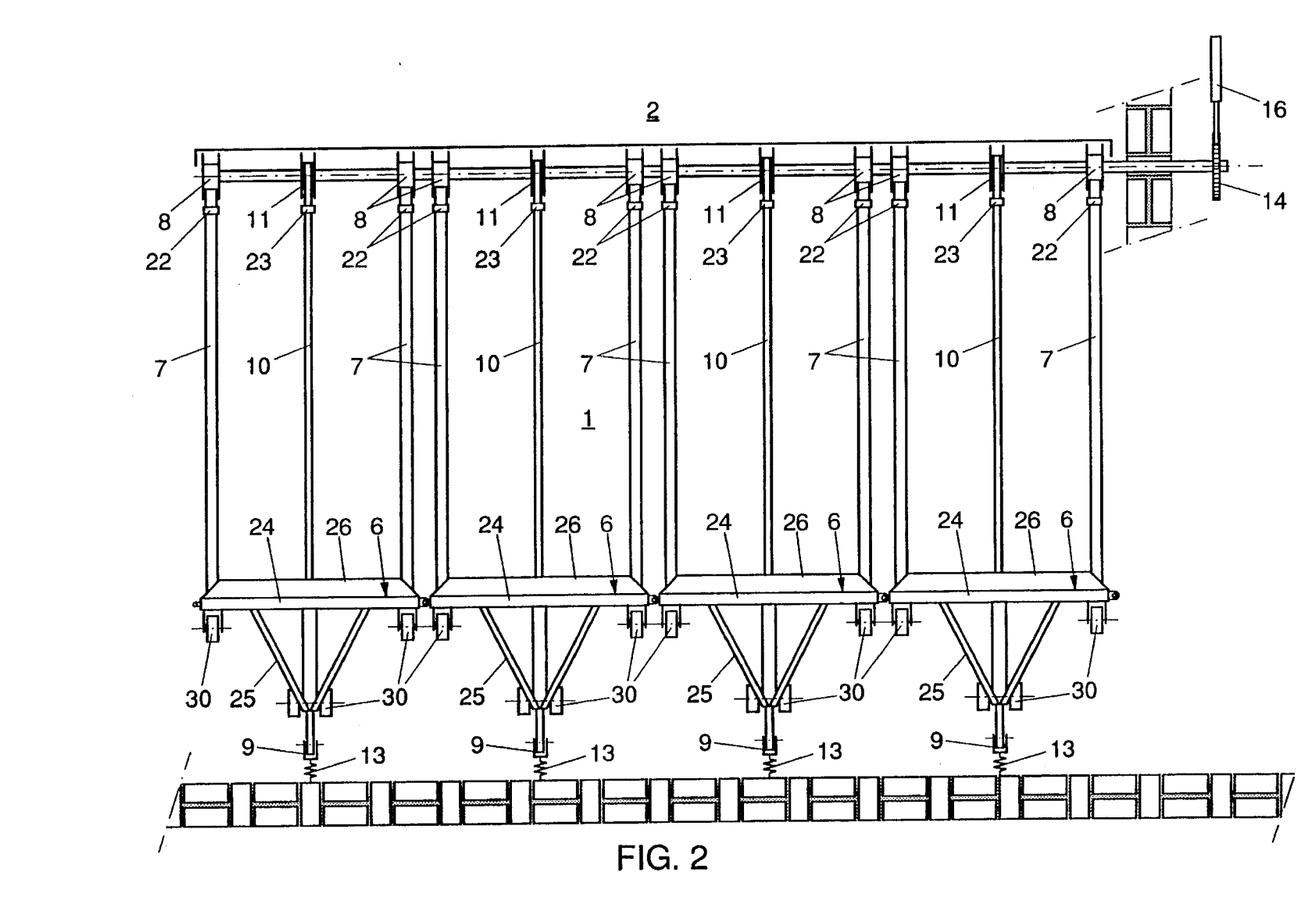
FIG. 2 is a top plan view of the stable according to FIG. 1, with a cutaway representation of a partition.

The slides 6 depicted in FIGS. 5-8 are adapted with regard to the slide 6 according to FIGS. 1 and 2 in order to prevent these problems.

Figure 5:
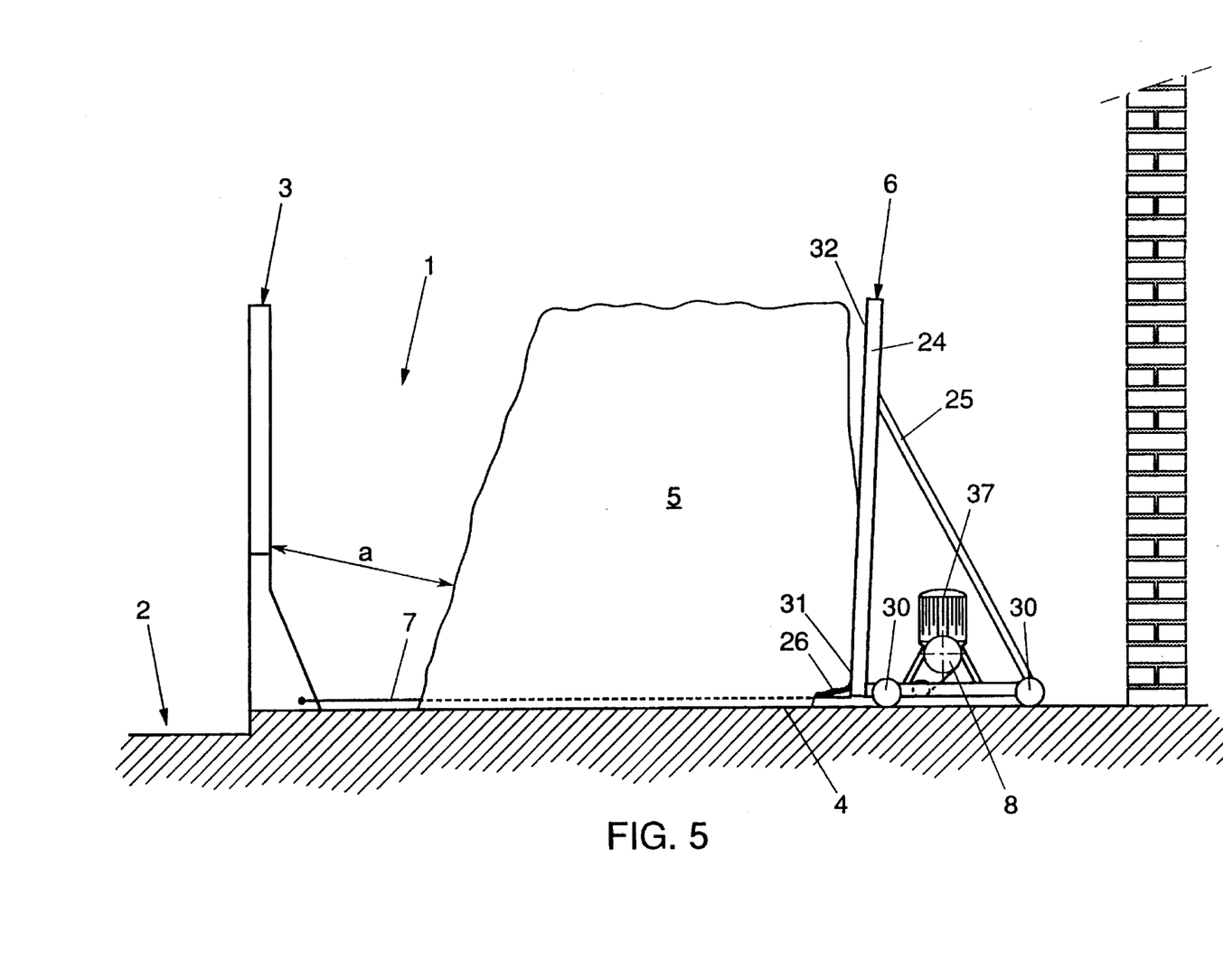
FIG. 5 is a side elevation of a part of a stable according to an alternative exemplary embodiment of the invention.
Figure 6:
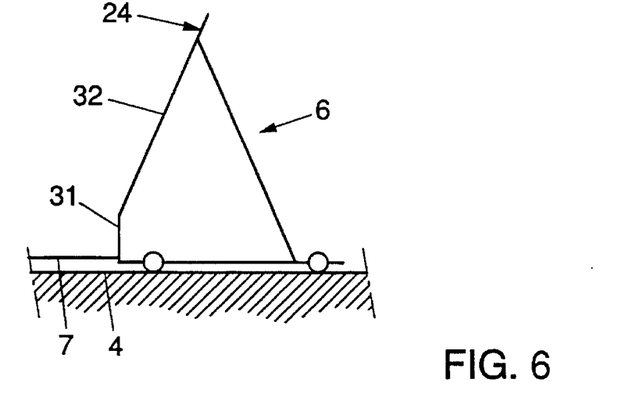
FIGS. 6–8 are diagrammatic side elevations of alternative embodiments of feed slides for use in a stable according to the invention.
Figure 7:
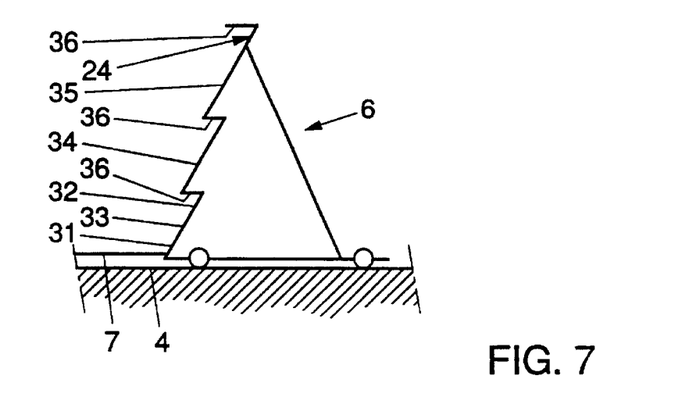
Figure 8:
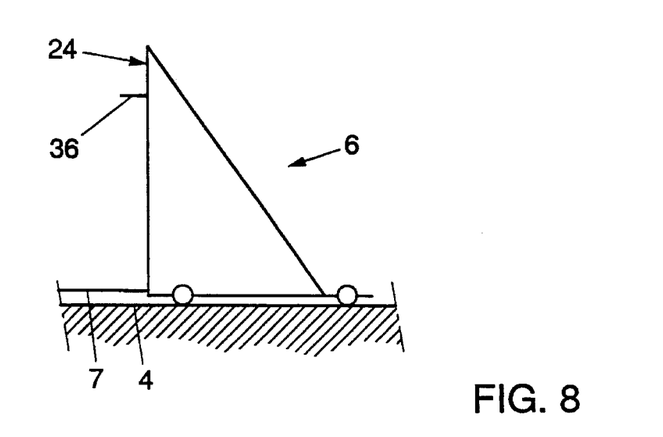

The feed slides according to FIGS. 5, 6 and 7, like the feed slide according to FIGS. 1 and 2, comprises a screen 24 projecting upwards from the vicinity of the floor. However, the screen 24 has a first part 31 adjacent the floor 4, which is located closer to the partition 3 than a second part 32 located above the first part 31. As a result, during displacement, a relatively large force is exerted on lower portions of the feed 5 in the direction of the partition 3, which in turn counteracts a downward rolling movement of the feed 5 towards the partition during displacement. Moreover, the distance of the line of action of the sum of the forces exerted on the feed 5 by the slide 6 and the frictional force exerted on the feed 5 by the floor 4 is reduced, so that the moment exerted on the feed during displacement is also reduced. Generally, in the practice of the slides according to FIGS. 5-7, during displacement the feed 5 is compressed relatively strongly near the floor 4, but it maintains better the block shape in which it has been supplied than in the case where a feed slide according to FIGS. 1 and 2 is used.

In the feed slide according to FIG. 5, the lower part 31 located closer to the partition 3 has been obtained by mounting the screen 24 on the slide 6 in such a manner that it slants continuously away from the partition 3 from a point near the floor 4 to near its top end. The screen 24 has a simple shape and may be identical to the screen 24 shown in FIGS. 1 and 2. The screen 24 preferably exhibits a deviation of 5–10% relative to the vertical.

The feed slide 6 shown in FIG. 5 comprises an electric motor 37 adapted to drive, by way of a worm wheel, a reel 8 on which the hauling band 7 is wound during the displacement of the feed slide 6 towards the partition 3.

Because the hauling band 7 is attached to a fixed point near the partition and in operation is wound onto a reel 8 suspended from the feed slide, the hauling band 7 in operation does not slide over the floor 4 but slides relative to the feed 5 when the feed 5 is being displaced towards the partition. Wear of the hauling band is less in the case of displacement along the feed than in the case of displacement over the floor 4, in particular if the floor is relatively rough.

In the feed slide according to FIG. 6, the lower part 31 located closer to the partition 3 has been obtained in that the second part 32 of the screen 24 adjoins the first part 31 and slants away from the partition 3 to a higher degree than the first part 31. The relatively steep configuration of the first part 31 counteracts upward creep of feed 5 from the floor 4 along the screen 24. The transition of the first part 31 to the second part 32 of the screen 24 further constitutes a stiffening of the screen 24 in the area where the pressure exerted in operation by the screen 24 on the feed 5 is largest.

In the feed slide according to FIG. 7, the lower part 31 located closer to the partition 3 has been obtained in that the screen 24 comprises 3 panels 33, 34, 35 located above each other and each slanting away from the partition 3, a lower part of the upper panel 34, 35 being located closer to the partition 3 than an upper part of the lower panel 33 and 34, respectively. The panels 33–35 each have a strong backward slant, so that the pressure exerted on the feed decreases with the distance to the floor.

Moreover, the lower parts of the panels 33–35 and a screen part 36 projecting above the uppermost panel 35 each form a screen part 36, spaced from the floor 4 and projecting from the screen 24 towards the partition 3, which prevents upward creep of feed 5 along the screen. The feed slide 6 according to FIG. 8 also comprises such a projecting element 36, but otherwise the screen is designed in correspondence with the screen according to FIGS. 1 and 2. The screen part 36 spaced from the floor 4 and projecting from the screen 24 towards the partition 3 may for instance be designed as a plate which in operation is located just above the feed 5, or as a row of pins which in operation are inserted into the feed. The ends of the pins should be rounded in order to limit the risk of injury of people and animals.

I claim:

1. A cubicle stable for keeping cows comprising:

a dwelling area;

a feeding area comprising a floor for storing and presenting feed;

a partition between the dwelling area and the feeding area, the partition comprising openings to allow heads of animals in the dwelling area access to the feeding area;

a feed slide movable from a starting position through the feeding area toward the partition and operable to push feed stored in the feeding area to the partition; and a plurality of flexible hauling elements extending between the feed slide and the partition for hauling the feed slide toward the partition;

a feed slide driver connected to the hauling members, the hauling members having a tensioned condition wherein a force is applied to the hauling members by the feed slide driver;

the hauling elements in the tensioned condition extending above and immediately adjacent the floor of the feeding area such that feed deposited in the feeding area between the feed slide and the partition is at least partially supported on the hauling members.

2. The cubicle stable in accordance with claim 1 and further comprising reels for winding the hauling members.

3. The cubicle stable in accordance with claim 2 and further comprising guide wheels disposed adjacent the feeding area floor and disposed between the feed slide and the reels to guide the hauling members adjacent the feed area floor.

4. The cubicle stable in accordance with claim 1 wherein the feed slide comprises a substantially vertically extending screen and a support member projecting from one side of the screen remote from the partition.

5. The cubicle stable in accordance with claim 1 wherein at least one of the flexible hauling members is designed as a hauling band.

6. The cubicle stable in accordance with claim 1 wherein the feed slide is movably supported on the floor and comprises a frontal surface on one end of the slide nearest the partition, the frontal surface comprising a first part projecting upwardly from a point near the floor and a second part spaced from the floor and projecting from the frontal surface toward the partition.

7. The cubicle stable in accordance with claim 1 wherein the flexible hauling members extend from the feed slide at a position adjacent to and above a lower end of the feed slide and at least one of the hauling members extends from a part of the feed slide intermediate lateral ends of the feed slide.

8. The cubicle stable in accordance with claim 1 wherein the feed slide comprises a base movably supported on the floor.

9. A stable, in particular a cubicle stable for keeping cows, comprising a dwelling area for animals, a feeding area with a floor for storing and presenting feed and a partition between the dwelling area and the feeding area with openings allowing heads of animals in the dwelling area access to the feeding area, at least one feed slide movable from a starting position through the feeding area toward the partition for pushing at least one feed stored in the feeding area over the floor of the feeding area to the partition and means for driving the at least one feed slide comprising a flexible hauling element extending between the at least one feed slide and the partition and a reel for winding up the hauling element, the reel being arranged in the area of the partition and the means for driving the feed slide further comprising a divert wheel mounted adjacent a side of the at least one feed slide remote from the partition, the means for driving further comprising a second hauling element and a second reel, the second hauling element extending by way of the divert wheel between the at least one feed slide and the second reel and coupled with the first reel for winding up the second hauling element.

10. The stable in accordance with claim 9 wherein the second reel and the first reel are mounted on a common shaft.

11. The stable in accordance with claim 9 wherein the means for driving the at least one feed slide comprises a tensioner for keeping the second hauling element tensioned between the second reel and the at least one feed slide.

12. The stable in accordance with claim 9 wherein the first reel is coupled with a ratchet wheel operable by a pawl coupled with a working cylinder.

13. The stable in accordance with claim 12 where the pawl and the ratchet wheel are adapted for driving the ratchet wheel in both directions.

14. The stable in accordance with claim 13 wherein the at least one feed slide comprises a substantially vertical screen and a plane foot projecting along the floor from the screen in the direction of the partition.

15. A stable, in particular a cubicle stable for keeping cows, comprising a dwelling area for animals, a feeding area with a floor for storing and presenting feed, and a partition between the dwelling area and the feeding area with openings allowing heads of animals in the dwelling area access to the feeding area, at least one feed slide movable from a starting position through the feeding area toward the partition for pushing feed toward the feeding area over the floor of the feeding area to the partition and a flexible hauling element extending between the at least one feed slide in the partition for hauling the at least one feed slide toward the partition and means, arranged on the side of the feeding area in front of the partition, for removing adherent feed from the hauling element.

16. The stable in accordance with claim 15 wherein the means for removing adherent feed from the hauling element are designed as a scraper.

17. The stable in accordance with claim 15 wherein the means for removing adherent feed from the hauling element are designed as a brush.

18. A stable, in particular a cubicle stable for keeping cows, comprising a dwelling area for animals, a feeding area with a floor for storing and presenting feed, and a partition between the dwelling area and the feeding area with openings allowing heads of animals in the dwelling area access to the feeding area, a feed slide, comprising a plurality of feed modules, movable from a starting position through the feeding area to the partition for pushing feed stored in the feeding area over the floor of the feeding area to the partition, the feed slide modules pivotally coupled to each other and allowing limited movement in a horizontal direction parallel to the feed slide modules, and a plurality of drive modules, corresponding in number to the number of feed slide modules, and each of the drive modules coupled for driving the displacement of a certain feed slide module.

19. A stable, in particular a cubicle stable for keeping cows, comprising a dwelling area for animals, a feeding area with a floor for storing and presenting feed, and a partition between the dwelling area and the feeding area with openings allowing heads of animals in the dwelling area access to the feeding area, at least one feed slide supported on the floor and movable from a starting position through the feeding area toward the partition for pushing feed stored in the feeding area over the floor of the feeding area to the partition, the at least one feed slide comprising a frontal surface on one end of the at least one feed slide nearest the partition, the frontal surface projecting upwardly from a point near the floor and comprising a first part adjacent the floor located closer to the partition than a second part located above the first part.

20. The stable in accordance with claim 19 wherein the at least one feed slide comprises a screen slants away from the partition continuously from a point near the floor to its top.

21. The stable in accordance with claim 19 wherein the second part of the frontal surface adjoins the first part thereof and slants away from the partition to a higher degree than the first part.

22. A stable, in particular a cubicle stable for keeping cows, comprising a dwelling area for animals, a feeding area with a floor for storing and presenting feed, and a partition between the dwelling area and the feeding area with openings allowing heads of animals in the dwelling area access to the feeding area, at least one feed slide movable from a starting position through the feeding area toward the partition for pushing feed stored in the feeding area over the floor of the feeding area to the partition, the at least one feed slide comprising a screen comprising at least two panels located above each other, each of the panels slanting away from the partition and a lower part of the uppermost panel being located closer to the partition than an upperpart of the lowermost panel.

* * * * *